United States Patent Office 3,147,290
Patented Sept. 1, 1964

3,147,290
6α-METHYL-17α,21-DIHYDROXY-4-PREGNENE-3,20-DIONE AND 21-ACETATE
George B. Spero, Kalamazoo, Mich., assignor to The Upjohn Company, Kalamazoo, Mich., a corporation of Delaware
No Drawing. Original application Feb. 19, 1958, Ser. No. 716,036. Divided and this application May 17, 1961, Ser. No. 110,654
2 Claims. (Cl. 260—397.47)

The present invention relates to steroid compounds and is more particularly concerned with the novel 6-methyl-17α-hydroxy-1,4-pregnadiene-3,20-diones (both the 6α- and 6β-methyl isomers) and esters thereof, and to the novel intermediates in the production thereof.

This application is a continuation-in-part of application Serial No. 623,774, filed November 23, 1956, and a division of application 716,036, filed February 19, 1958.

The novel compounds and the process of the present invention are illustratively represented by the following formulae:

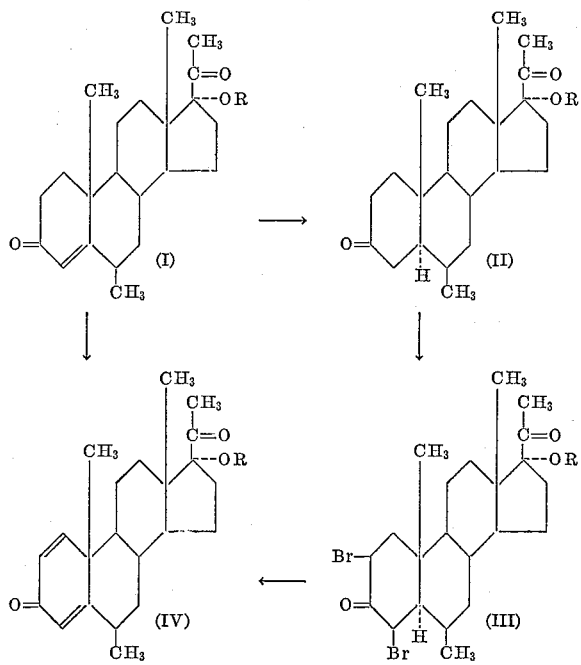

wherein R is hydrogen or the acyl radical of an organic carboxylic acid, preferably a hydrocarbon carboxylic acid containing from one to twelve carbon atoms, inclusive.

It is an object of the instant invention to provide 6-methyl-17α-hydroxy-1,4-pregnadiene-3,20-dione (both the 6α- and 6β-methyl isomers), the 17-esters thereof, and intermediates for the production thereof. It is another object of the instant invention to provide methods for the production of the novel compounds and novel intermediates. Other objects of this invention will be apparent to those skilled in the art to which this invention pertains.

The new products 6-methyl-17α-hydroxy-1,4-pregnadiene-3,20-dione and 17-esters thereof have utility as oral and parenteral progestational agents. Owing to their progesterone-like effects, the compounds of this invention find application in "cyclic" therapy, where estrogenic and progestational hormones are supplied together or in succession so as to favor re-establishment of normal endometrium-ovary-anterior pituitary relationships in cases of menstrual disturbances.

In addition the novel compounds affect the secretion of gonadotropins and thus regulate ovulation and endometrial and placental development and, particularly when used in conjunction with estrogens or androgens reduce fertility. The novel compounds are effective in the therapy of dysmenorrhea, amenorrhea, endometriosis, threatened abortion and related gynecological disorders.

The novel compounds of this invention can be prepared and administered to the animal organism in a wide variety of oral or parenteral dosage forms, singly, or in admixture with other coacting compounds. They can be associated with a pharmaceutical carrier which can be a solid material or a liquid in which the compound is dissolved, dispersed or suspended. The solid compositions can take the form of tablets, powders, capsules, pills or the like, preferably in unit dosage forms for simple administration or precise dosages. The liquid compositions can take the form of solutions, emulsions, suspensions, syrups or elixirs. The novel compounds can also be administered topically in the form of ointments, creams, bougies, lotions and the like, with or without coating antibiotics, germicides or other materials forming advantageous compositions therewith.

The process of the present invention comprises: hydrogenating a 6-methyl 17α-hydroxyprogesterone or a 17-ester thereof (I) with hydrogen in the presence of a palladium catalyst to obtain the corresponding saturated compounds (II), 6-methyl-17α-hydroxyallopregnane-3,20-dione, 6-methyl-17α-hydroxypregnane-3,20-dione or the 17-esters thereof; brominating the thus obtained 6-methyl-17α-hydroxyallopregnane-3,20-dione or a 17-ester thereof with bromine to give the corresponding 2,4-dibromo compound (III); and dehydrobrominating the thus obtained 2,4 - dibromo - 6-methyl-17α-hydroxyallopregnane-3,20-dione or a 17-ester thereof to give 6-methyl-17α-hydroxy-1,4-pregnadiene-3,20-dione or a 17-ester thereof (IV). The 17-esters can also be obtained by acylation of the 17-hydroxyl group of the final product, 6-methyl-17α-hydroxy-1,4-pregnadiene-3,20-dione, with an acylating agent selected from anhydrides and halides of organic carboxylic acids or preferably hydrocarbon carboxylic acids containing from one to twelve carbon atoms, inclusive. Alternatively the 1,4-dehydro compounds of this invention, represented by Formula IV, can be prepared from 6-methyl-17α-hydroxy-progesterone by microbiological dehydration with Septomyxa affinis, A.T.C.C. 6737 or with selenium dioxide. The resulting 6-methyl-17α-hydroxy-1,4-pregnadiene-3,20-dione can, if desired, be esterified to give the corresponding 17-esters.

In a further method for the production of the compounds of the present invention 6-methylprogesterone is converted to 6-methyl-17α,21-dihydroxy-4-pregnene-3,20-dione (6-methyl Reichstein's Substance S) which is then dehydroxylated at the 21-position to give 6-methyl-17α-hydroxy-progesterone. The thus obtained 6-methyl-17α-hydroxy-progesterone is dehydrogenated with selenium dioxide or Septomyxa affinis at the 1-position to give 6-methyl - 17α - hydroxy - 1,4-pregnadiene-3,20-dione. The above conversions are more fully described in Examples 4, 4a, 5 and 6.

The starting compounds of the present invention are 6-methyl-17α-hydroxyprogesterone and 17-esters thereof, produced as shown in Preparations 1 through 8, and 6-methylprogesterone [Ellis et al., J. Chem. Soc., 4092 (1957)].

In carrying out the process of the present invention, the first step involves hydrogenation of the 4,5-double bond of a 6-methyl-17α-hydroxyprogesterone or a 17-ester thereof. The hydrogenation can be accomplished with hydrogen in the presence of a catalyst such as palladium supported on charcoal, and is usually conducted in a solvent medium. Alkanols, hexane, acetone, methyl ethyl ketone, dioxane, acetic acid, ethyl acetate, or like organic solvents may be advantageously employed, with ethyl alcohol being preferred. The catalyst can be saturated with hydrogen prior to the introduction of the steroid or preferably the steroid, catalyst and supporting media can be contacted together in a solvent medium prior to introduction of the hydrogen. It is not necessary to conduct the reaction under pressure, although, when pressure is utilized, a hydrogen pressure of about one to 100 pounds or more is operative, a pressure of from about twenty to forty pounds is preferred. Any suitable temperature between about zero and 100 degrees centigrade may be employed, with room temperature being satisfactory. Hydrogenation is continued until approximately one molar equivalent of hydrogen has been absorbed. The catalyst is then separated from the solution by filtration and the hydrogenated products are isolated by removal of the solvent. Usually the crude hydrogenation product is a mixture containing both the normal and the allo isomers, i.e., 6-methyl-17α-hydroxypregnane-3,20-dione and 6-methyl-17α-hydroxyallopregnane-3,20-dione or the 17-esters thereof. The isomers are separated by conventional means such as for example, fractional crystallization or chromatography. Alternatively the normal and allo isomers can be conveniently separated by reaction of the mixture with pyrrolidine to form the 3-pyrrolidyl enamine. The 3-pyrrolidyl enamine of the allo isomer is the least soluble in the reaction mixture and crystallizes out leaving the 3-pyrrolidyl enamine of the normal isomer in solution. After separation, for example, by filtration, the enamine group is removed by treatment with base or with water to regenerate the 3-ketone and produce the corresponding 6-methyl-17α-hydroxypregnane-3,20-dione or 6-methyl-17α-hydroxyallopregnane-3,20-dione, or the 17-esters thereof.

The allo isomers thus produced, i.e., a 6-methyl-17α-hydroxyallopregnan-3,20-dione or a 17-ester thereof is brominated at positions 2 and 4. Bromination is conducted between a temperature of zero to forty degrees centigrade with room temperature (twenty to thirty degrees centigrade) being usually satisfactory. The reaction is carried out in an organic solvent for a period of a few minutes to about 24 hours. In the preferred embodiment of the reaction, bromine, usually in solution in the reaction solvent, is added to a solution of the steroid, dissolved in the reaction solvent. Reaction solvents employed are, for example, acetic acid, propionic acid, chloroform, methylene chloride, benzene, chlorobenzene, carbon tetrachloride, hexane, ether, and the like, with acetic acid being the preferred solvent. The amount of bromine used in the reaction is usually in excess of two moles, e.g., from about two to 2.2 moles of bromine per mole of steroid. It is sometimes advantageous to add a small amount of hydrobromic acid solution to the reaction mixture in order to facilitate initiation of the bromination. When the reaction is completed, the product is drowned out by the addition of water and isolated by any conventional means such as filtration or extraction with a water-immiscible solvent. The crude product, 2,4-dibromo-17α-hydroxyallopregnane-3,20-dione or a 17-ester thereof, can be purified by crystallization from an organic solvent or it can be used directly in the dehydrobromination step without purification.

In the dehydrobromination step of the present invention, the starting 2,4-dibromo steroid is usually dissolved in the dehydrohalogenation agent, if it is a liquid solvent for the steroid, or both the dehydrohalogenation agent and the steroid are dissolved in a substantially inert diluent and then heated, usually at a temperature substantially above room temperature, e.g., between about fifty and about 250 degrees centigrade, for about fifteen minutes to several hours, although the reaction ordinarily begins as soon as the heating commences. Since 2,4,6-trimethylpyridine (γ-collidine) is usually preferred as the dehydrohalogenation agent, the reaction is usually performed at about the boiling point of 2,4,6-trimethylpyridine, unless an organic diluent is employed. Ordinarily, the dehydrohalogenation agent is employed in a ratio to the starting steroid of about four to one or greater. On completion of the reaction, the reaction mixture is cooled and poured into a dilute solution of an acid, preferably a mineral acid, e.g., sulfuric acid. The product, 6-methyl-17α-hydroxy-1,4-pregnadiene-3,20-dione or a 17-ester thereof, is extracted from the acid mixture with a water-immiscible solvent such as, for example, methylene chloride and is purified by conventional means such as recrystallization, chromatography, or both.

Dehydrohalogenation agents which can be employed include, lithium chloride, potassium acetate, pyridine and the alkyl pyridines, e.g., the picolines, β-lutidines, α,β-collidines, γ-collidines, and the like. Of the dehydrohalogenation agents, γ-collidine, viz., 2,4,6-trimethylpyridine is the preferred dehydrohalogenation agent.

Alternatively, the compounds of the present invention, represented by Formula IV, can be prepared by microbiological or selenium dioxide dehydrogenation at the 1-position. Dehydrogenation of 6α-methyl-17α-hydroxyprogesterone or 6β-methyl-17α-hydroxyprogesterone with *Septomyxa affinis*, A.T.C.C. 6737 or with selenium dioxide is productive of 6α-methyl-17α-hydroxy-1,4-pregnadiene-3,20-dione and 6β-methyl-17α-hydroxy-1,4-pregnadiene-3,20-dione, respectively.

The compounds of this invention, represented by Formula IV, can be utilized either as the free alcohols or as the esters. Esterification is carried out by methods well established in the art for esterifying tertiary hydroxyl groups, e.g., Huang-Minlon et al., J. Am. Chem. Soc., 74, 5394 (1952). Huang-Minlon et al. describe both a "cold method" and a "hot method," both of which are useful in the esterification of 6-methyl-17α-hydroxy-1,4-pregnadiene-3,20-dione. Esterification is accomplished by allowing the hydroxy compounds to react with the anhydride of an organic carboxylic acid, preferably a hydrocarbon carboxylic acid containing from one to twelve carbon atoms, inclusive, for example, a saturated straight-chain aliphatic acid, e.g., acetic, propionic, butyric, valeric, hexanoic, lauric, a saturated branched-chain aliphatic acid, e.g., trimethylacetic, isobutyric, isovaleric, a cycloaliphatic saturated acid, e.g., cyclohexanecarboxylic acid, an alkaryl acid, e.g., phenylacetic, 2-phenylpropionic, o-, m-, and p-toluic, a saturated dibasic acid (which can be converted into water-soluble salts, e.g., sodium, salts), e.g., succinic, adipic, a monobasic unsaturated acid, e.g., acrylic, crotonic, undecylenic, propiolic, cinnamic, a dibasic unsaturated acid (which can be converted into water-soluble, e.g., sodium, salts), e.g., maleic and citraconic.

Illustrative of the esters thus produced are:

6α-methyl-17α-hydroxy-1,4-pregnadiene-3,20-dione 17-acetate,
6α-methyl-17α-hydroxy-1,4-pregnadiene-3,20-dione 17-propionate,
6α-methyl-17α-hydroxy-1,4-pregnadiene-3,20-dione 17-phenylacetate,
6α-methyl-17α-hydroxy-1,4-pregnadiene-3,20-dione 17-hemisuccinate,
6α-methyl-17α-hydroxy-1,4-pregnadiene-3,20-dione 17-isovalerate,
6α-methyl-17α-hydroxy-1,4-pregnadiene-3,20-dione 17-maleate,
6α-methyl-17α-hydroxy-1,4-pregnadiene-3,20-dione 17-propiolate,
6α-methyl-17α-hydroxy-1,4-pregnadiene-3,20-dione 17-crotonate,
6α-methyl-17α-hydroxy-1,4-pregnadiene-3,20-dione 17-butyrate,
6β-methyl-17α-hydroxy-1,4-pregnadiene-3,20-dione 17-acetate,
6β-methyl-17α-hydroxy-1,4-pregnadiene-3,20-dione 17-hexanoate,
6β-methyl-17α-hydroxy-1,4-pregnadiene-3,20-dione 17-laurate, 6α-methyl-17α-hydroxy-1,4-pregnadiene-3,20-dione 17-trimethylacetate,
6α-methyl-17α-hydroxy-1,4-pregnadiene-3,20-dione 17-acrylate,
6β-methyl-17α-hydroxy-1,4-pregnadiene-3,20-dione 17-isobutyrate,
6β-methyl-17α-hydroxy-1,4-pregnadiene-3,20-dione 17-phenylpropionate,
6β-methyl-17α-hydroxy-1,4-pregnadiene-3,20-dione 17-adipate, and the like.

The following preparations and examples are illustrative of the products and process of the present invention and are not to be construed as limiting.

PREPARATION 1

*17α-Hydroxyprogesterone 3,20-Bis-(Ethylene Ketal)*

A solution was prepared containing 50.0 grams of 17α-hydroxyprogesterone in 1000 milliliters of benzene, 100 milliliters of ethylene glycol and 2.5 grams of paratoluenesulfonic acid monohydrate. This mixture was refluxed for a period of seventeen hours using a calcium carbide water-trap to remove the water formed in the reaction. After this period of reflux 6.5 milliliters of pyridine was added to the solution, and the mixture cooled to room temperature. The lower glycol layer was separated and washed with benzene. The benzene layer and the benzene washings were combined and the combined solution was divided into two equal portions, one of which was used for the isolation of 17α-hydroxyprogesterone 3,20-bis-(ethylene ketal) as follows: The benzene solution was washed with five percent sodium carbonate solution, water and saturated sodium chloride solution. After being dried over anhydrous magnesium sulfate the solution was concentrated to dryness at reduced pressure. The residue was recrystallized by taking up in hot methylene chloride, adding acetone and boiling to remove the methylene chloride until a final volume of about 200 milliliters was reached. The solution was then refrigerated overnight and 17.8 grams of crystals were removed by filtration. A second crop was obtained yielding 3.7 grams of compound. The total yield of 17α-hydroxyprogesterone 3,20-bis-(ethylene ketal) was 20.3 grams (64.3 percent of theory). Recrystallization of the crude 17α-hydroxyprogesterone 3,20-bis-(ethylene ketal) from methanol gave the pure bisketal of melting point 209 to 211 degrees centigrade and rotation [α]$_D$ minus 49 degrees (in chloroform).

*Analysis.*—Calculated for $C_{25}H_{38}O_5$: C, 71.74; H, 9.15. Found: C, 71.65; H, 9.38.

PREPARATION 2

*5α,6α-Oxido-17α-Hydroxyallopregnane-3,20-Dione 3,20-Bis-(Ethylene Ketal)*

A solution was prepared by heating 19.96 grams (0.0477 mole) of 17α-hydroxyprogesterone 3,20-bis-(ethylene ketal) and 500 milliliters of benzene. After the solution was effected the flask was cooled to five degrees centigrade and a mixture of 3.68 grams (0.0449 mole) of sodium acetate and 174 milliliters of forty percent peracetic acid was added with stirring. The reaction mixture was stirred in the ice bath for three hours. The lower peracid layer was separated, diluted with water and extracted twice with benzene. The upper layer was neutralized by the addition of cold ten percent sodium hydroxide solution while stirring in an ice bath. The rate of addition of the sodium hydroxide was regulated to keep the temperature below ten degrees centigrade. The benzene extracts from the peracid layer were combined and washed with cold ten percent sodium hydroxide solution and with saturated sodium chloride solution. All the aqueous layers were washed again with the same portion of benzene. The combined benzene layers were dried over anhydrous magnesium sulfate and concentrated to dryness at reduced pressure. The residue was recrystallized from acetone using methylene chloride to aid in solution. The crystalline material was removed by filtration and was recrystallized from methylene chloride-acetone to yield a total of eight grams of 5α,6α-oxido-17α-hydroxyallopregnane-3,20-dione 3,20 - bis - (ethylene ketal) of melting point 211 to 215. For analytical purposes, another recrystallization from methylene chloride-acetone gave pure 5α,6α-oxido-17α-hydroxyallopregnane-3,20-dione 3,20-bis-(ethylene ketal) of melting point 216 to 218.5 degrees centigrade and rotation [α]$_D$ of minus seventy degrees in chloroform.

*Analysis.*—Calculated for $C_{25}H_{38}O_6$: C, 69.09; H, 8.81. Found: C, 69.05; H, 9.04.

PREPARATION 3

*5α,17α-Dihydroxy-6β-Methylallopregnane-3,20-Dione 3,20-Bis-(Ethylene Ketal)*

To a solution of 91.6 grams of 5α,6α-oxido-17α-hydroxyallopregnane-3,20-dione 3,20-bis-(ethylene ketal) in 3,500 milliliters of freshly distilled tetrahydrofuran was added 1170 milliliters of commercial three molar methyl magnesium bromide in ether solution. The reaction mixture was boiled to remove 1800 milliliters of solvent by distillation and thereafter 1000 milliliters of freshly distilled tetrahydrofuran was added. Boiling was continued under reflux for a period of sixteen hours. The solution was then concentrated to about one-half its original volume by distillation and was poured slowly with vigorous stirring into a large volume of ice water containing 340 grams of ammonium chloride. The aqueous solution was saturated with sodium chloride and extracted with benzene. The benzene extract was washed with saturated brine, and both aqueous layers were washed again with the same portions of benzene. The combined benzene layers were dried over anhydrous sodium carbonate and the solvent was removed at reduced pressure to give 90.5 grams of crude crystalline 5α,17α-dihydroxy-6β-methylallopregnane-3,20-dione 3,20-bis-(ethylene ketal). Half of the residue, 45.2 grams, was recrystallized from acetone and some methylene chloride to give 34.4 grams of 5α, 17α - dihydroxy-6β-methylallopregnane-3,20-dione, 3,20-bis-(ethylene ketal). A sample recrystallized from acetone and methylene chloride for analysis melted at 160 to 163 degrees centigrade and had roation [α]$_D$ of minus 38 degrees in chloroform.

*Analysis.*—Calculated for $C_{26}H_{42}O_6$: C, 69.30; H, 9.40. Found: C, 68.90; H, 9.78.

PREPARATION 4

*5α,17α-Dihydroxy-6β-Methylallopregnane-3,20-Dione*

A solution was prepared containing 38.9 grams of 5α, 17α - dihydroxy - 6β-methylallopregnane-3,20-dione 3,20-bis-(ethylene ketal) in 389 milliliters of boiling acetone. Thereto was added 39 milliliters of one normal sulfuric acid in portions under swirling and seeding with product. Boiling was continued for a period of two minutes and the mixture was allowed to stand at room temperature. Thereafter the mixture was diluted with 1500 milliliters of water, chilled and filtered. The precipitate was washed with water, dilute ammonium hydroxide and water, and dried in a vacuum oven overnight. The yield was 31.2 grams which was recrystallized by dissolving in 1200 milliliters of dimethylformamide, heating to 150 degrees centigrade, cooling slightly, and adding twelve milliliters of hot water. The recrystallized 5α,17α-dihydroxy-6β-methylallopregnane-3,20-dione thus obtained was 28.75 grams of melting point 270 to 275.5 degrees centigrade. After an additional recrystallization from aqueous dimethylformamide, the melting point was 274 to 279 degrees centigrade.

PREPARATION 5

6α-Methyl-17α-Hydroxyprogesterone

A suspension was made by introducing two grams of 5α,17α-dihydroxy-6β-methylallopregnane-3,20-dione into 200 milliliters of chloroform. The suspension was chilled in an ice bath with stirring, and thereupon hydrogen chloride was bubbled through the reaction mixture for eighty minutes with continuous cooling and stirring. During this period the steroid went into solution. After bubbling in nitrogen for a period of fifteen minutes the solution was washed with water, one normal sodium bicarbonate solution and again with water. The aqueous layers were rewashed with one portion of chloroform, and the washings combined with the remainder of the chloroform solution. After drying over anhydrous magnesium sulfate, the chloroform solution was concentrated to dryness, then taken up in a small volume of methylene chloride, treated with Magnesol anhydrous magnesium silicate and filtered. Acetone was added to the solution and the solution was boiled to remove the methylene chloride. After the solution was concentrated to a volume of about fifteen milliliters it was chilled and the crystals were collected through filtration. The 1.37 grams of crystals so obtained were recrystallized from acetone to give pure 6α-methyl-17α-hydroxyprogesterone of melting point 220 to 223.5 degrees centigrade and a roation $[\alpha]_D$ of plus 75 degrees centigrade in chloroform.

*Analysis.*—Calculated for $C_{22}H_{32}O_3$: C, 76.70; H, 9.36. Found: C, 76.24; H, 9.30.

PREPARATION 6

6β-Methyl-17α-Hydoxyprogesterone

A solution of 400 milliliters of pyridine, 100 milliliters of ethyl alcohol, 25 milliliters of water and containing three milliliters of one normal sodium hydroxide solution was purged of oxygen by bubbling nitrogen through the solution for a period of several minutes. Thereto was added five grams of 5α,17α-dihydroxy-6β-methylallopregnane-3,20-dione. The mixture was stirred vigorously and the steriod was completely dissolved after 25 minutes. After a total reaction time of three and one quarter hours, the reaction was stopped by the addition of one milliliter of acetic acid and the mixture concentrated to dryness at reduced pressure.

The dry residue was taken up in about 500 milliliters of a warm mixture of acetone and methylene chloride. The solution was filtered to remove the organic-insoluble material and the filtrate was concentrated to about 110 milliliters, chilled and the crystals thus obtained collected by filtration. A yield of 3.70 grams of crude 6β-methyl-17α-hydroxyprogesterone was obtained, which after recrystallization from acetone melted at 232 to 240 degrees centrigrade and had roation $[\alpha]_D$ of plus 34 degrees in chloroform.

PREPARATION 7

6α-Methyl-17-Hydroxyprogesterone 17-Acetate

One gram of 6α-methyl-17α-hydroxyprogesterone was dissolved in a mixture of ten milliliters of acetic acid and two milliliters of acetic anhydride by heating. After solution was effected the mixture was cooled to fifteen degrees centigrade, and 0.3 gram of paratoluenesulfonic acid was added. After allowing the mixture to stand for a period of two and one half hours at room temperature, the pink solution was poured into ice water to give an amorphous solid which was recovered by filtration. The precipitate was washed carefully with water and was then dissolved in ten milliliters of methanol and 1.5 milliliters of methylene chloride. The solution was concentrated to ten milliliters, diluted with 0.5 milliliter of ten percent sodium hydroxide, boiled for one minute and cooled. The product, which crystallized on cooling, was recrystalized to give flakes of 6α-methyl-17α-hydroxyprogesterone 17-acetate, having a melting point of 205 to 209 degrees centigrade and rotation $[\alpha]_D$ plus 56 degrees centigrade in chloroform.

PREPARATION 8

6β-Methyl-17α-Hydroxyprogesterone 17-Acetate

In the same manner as given in Preparation 7 one gram of 6β-methyl-17α-hydroxyprogesterone was treated with acetic anhydride in acetic acid in the presence of 0.1 gram of para-toluenesulfonic acid. After one hour the mixture was poured into ice water and the solids recovered by filtration. Recrystallization of the solids from methanol and methylene chloride gave 6β-methyl-17α-hydroxyprogesterone 17-acetate.

In the same manner as shown in Examples 7 and 8 other esters of 6α- and 6β-methyl-17α-hydroxyprogesterone are produced by allowing the anhydride or isopropenyl acylate of a selected acid to react with the steroid and if desired hydrolyzing with dilute alkali metal hydroxide any enol acylates produced. In this manner the acetate, propionate, butyrate, isobutyrate, valerate, isovalerate, hexanoate, heptanoate, octanoate, benzoate, phenylacetate, phenylpropionate, β-cyclopentylpropionate, decanoate, undecanoate, laurate, undecylenate, crotonate, acrylate, and the like of 6α- and 6β-methyl-17α-hydroxyprogesterone are prepared.

EXAMPLE 1

6α-Methyl-17α-Hydroxyallopregnane-3,20-Dione and 6α-Methyl-17α-Hydroxypregnane-3,20-Dione A solution of five grams of 6α-methyl-17α-hydroxyprogesterone in 200 milliliters of 95 percent ethanol containing 0.5 gram of five percent palladium on charcoal was hydrogenated with hydrogen at room temperature and at thirty pounds of pressure until one equivalent of hydrogen was absorbed at which time the uptake of hydrogen ceased. The catalyst was removed by filtration and the filtrate was concentrated to dryness under reduced pressure. The residue which consisted of a mixture of the allo and the normal isomeric compounds was separated by fractional crystallization from acetone to give essentially pure 6α-methyl-17α-hydroxyallopregnane-3,20-dione and 6α-methyl-17α-hydroxypregnane-3,20-dione.

Alternatively, the two isomers can be separated by reaction of the crude residue mixture from the hydrogenation with three milliliters of pyrrolidine in 25 milliliters of methanol at reflux temperature and under an atmosphere of nitrogen for about two minutes. The 3-pyrrolidyl enamine of the allo compound thus formed is more insoluble and crystallizes out of solution. Removal of the crystalline material leaves the mother liquor containing the normal isomer, the 3-pyrrolidyl enamine of 6α-methyl-17α-hydroxypregnane-3,20-dione, which is isolated by removal of the solvent and crystallization of the residue from acetone. The two isomers are regenerated from the enamine by dissolving the enamine in 150 milliliters of methanol containing fifteen milliliters of ten percent sodium hydroxide solution and warming at fifty degrees centigrade for twenty minutes. The solution is then cooled, neutralized with acetic acid and concentrated to near dryness under reduced pressure. The residue is extracted with ether and the ether is washed, dried, and evaporated to dryness. The resulting residue is crystallized from acetone to give the corresponding pure allo and normal isomers, 6α-methyl-17α-hydroxyallopregnane-3,20-dione and 6α-methyl - 17α - hydroxypregnane-3,20-dione.

Following the hydrogenation procedure described above but substituting 6β-methyl-17α-hydroxyprogesterone as starting material therein, is productive of 6β-methyl-17α-hydroxyallopregnane-3,20-dione and 6β-methyl-17α-hydroxypregnane-3,20-dione.

Example 2

2,4-Dibromo-6α-Methyl-17α-Hydroxyallopregnane-3,20-Dione

A solution of thirty grams of bromine in 150 milliliters of glacial acetic acid was added slowly with stirring to a solution of 30.5 grams of 6α-methyl-17α-hydroxyallopregnane-3,20-dione in three liters of glacial acetic acid containing one milliliter of four normal hydrogen bromide in acetic acid. The reaction mixture was allowed to stand for sixteen hours after addition of the bromine and was then diluted with water until crystallization took place. The solid was isolated by filtration and recrystallized from ethyl acetate-Skellysolve B hexanes to give 2,4-dibromo-6α-methyl-17α-hydroxyallopregnane-3,20-dione.

In like manner bromination of 6β-methyl-17α-hydroxyallopregnane-3,20-dione is productive of 2,4-dibromo-6β-methyl-17α-hydroxyallopregnane-3,20-dione.

Example 3

6α-Methyl-17α-Hydroxy-1,4-Pregnadiene-3,20-Dione

Ten grams of 2,4-dibromo-6α-methyl-17α-hydroxyallopregnane-3,20-dione was dissolved in thirty milliliters redistilled γ-collidine and the solution was allowed to reflux for forty minutes. The reaction solution was then cooled, poured into sufficient cold dilute sulfuric acid to bind the base as the sulfate salt, and extracted with methylene chloride. The methylene chloride extract was chromatographed over 300 grams of Florisil (synthetic magnesium silicate) using Skellysolve B hexanes plus increasing proportions of acetone for elution of the column. The fractions exhibiting a negative Beilstein test and an ultraviolet absorption maximum at 238 to 246 mμ were combined and crystallized from Skellysolve B hexanes-acetone to give 6α-methyl-17α-hydroxy-1,4-pregnadiene-3,20-dione.

In like manner dehydrobromination of 2,4-dibromo-6β-methyl-17α-hydroxyallopregnane-3,20-dione with γ-collidine is productive of 6β-methyl-17α-hydroxy-1,4-pregnadiene-3,20-dione.

In essentially the same manner as described in Examples 1, 2 and 3, a 6-methyl-17α-hydroxyprogesterone 17-acylate, particularly a 17-acetate, is converted to the corresponding 6-methyl-17α-hydroxy-1,4-pregnadiene-3,20-dione 17-acylate, e.g., 6α-methyl-17α-hydroxy-1,4-pregnadiene-3,20-dione 17-acetate, 6β-methyl-17α-hydroxy-1,4-pregnadiene-3,20-dione 17-acetate, and the like.

Example 4

6α-Methyl-17α-Hydroxy-1,4-Pregnadiene-3,20-Dione

Five 100 milliliter portions of a medium, in 250 milliliter Erlenmeyer flasks, containing one percent glucose, two percent corn steep liquor (sixty percent solids) and tap water, were adjusted to a pH of 4.9. This medium was sterilized for 45 minutes at fifteen pounds per square inch pressure and inoculated with a one to two day growth of *Septomyxa affinis*, A.T.C.C. 6737. The Erlenmeyer flask was shaken at room temperature (about 26 to 28 degrees centigrade) for a period of three days. At the end of this period this 500-milliliter volume was used as an inoculum for ten liters of the same glucose-corn steep liquor medium which in addition contained ten milliliters of an antifoam compound (a mixture of lard oil and octadecanol). The fermentor was placed into the waterbath, adjusted to 28 degrees centigrade and the contents stirred (300 r.p.m.) and aerated (0.3 liter air per minute to five liters of beer). After 24 hours of incubation, when a good growth had been developed, five grams of 6α-methyl-17α-hydroxyprogesterone plus one-half gram of 3-ketobisnor-4-cholen-22-al, dissolved in 25 milliliters of dimethylformamide was added and the incubation carried out at the same temperature (28 degree centigrade) and aeration for a period of 72 hours (final pH 8.3). The mycelium was filtered off and washed with water. The washwater was combined with the filtrate and the whole was extracted with three two-liter portions of a mixture of methylenechloride ethyl acetate (3:1). Removal of the solvent by evaporation gave crude solid which was crystallized from Skellysolve B hexanes to give 6α-methyl-17α-hydroxy-1,4-pregnadiene-3,20-dione.

Similarly, fermentation of 6β-methyl-17α-hydroxyprogesterone with *Septomyxa affinis* is productive of 6β-methyl-17α-hydroxy-1,4-pregnadiene-3,20-dione.

Example 4a

6α-Methyl-17α-Hydroxy-1,4-Pregnadiene-3,20-Dione 17-Acetate

A solution of 2.5 grams of 6α-methyl-17α-hydroxy-4-pregnene-3,20-dione 17-acetate, 1.5 grams of selenium dioxide, 125 milliliters of t-butyl alcohol and 3.75 milliliters of acetic acid was refluxed for four hours under a stream of nitrogen. The solvent was removed under a fast stream of nitrogen and the residue was taken up in chloroform and washed with saturated sodium bicarbonate solution, freshly prepared ammonium sulfide solution, ammonium hydroxide, water, dilute hydrochloric acid and again with water. The solvent was removed and the residue dissolved in methylene chloride and chromatographed through Florisil. The column was washed with increasing amounts of acetone in Skellysolve B. The desired product contaminated with starting material was eluted with 10–14 percent acetone in Skellysolve B. The impure product (1.1 percent) was dissolved in about 15 milliliters of boiling methanol and one milliliter of pyrrolidine added. After boiling about three minutes the solution was poured into cold methylene chloride with cooling. The cold solution was washed with iced three normal hydrochloric acid to remove the enamine of the undesired starting material, then with water. The organic solution was dried and the solvent removed. The residue was dissolved in methylene chloride and chromatographed through a 75 gram Florisil column. The product, eluted with ten percent acetone in Skellysolve B, was recrystallized from acetone-Skellysolve B to give 0.3 gram of 6α-methyl-17α-hydroxy-1,4-pregnadiene-3,20-dione 17-acetate, melting point 224–227.5, $\lambda^{alc}_{max.}$ 243.5 mμ, $a_M$=15,875, $[\alpha]_D$ 11 degrees (CHCl$_3$)

*Analysis.*—Calculated for $C_{24}H_{32}O_4$: C, 74.96; H, 8.39. Found: C, 74.63; H, 8.62.

Example 5

6α-Methyl-17α,21-Dihydroxy-4-Pregnene-3,20-Dione (6α-Methyl, Reichstein's Substance S)

A solution of 8.21 grams of 6α-methylprogesterone in 125 milliliters of tertiary butyl alcohol was prepared by heating to 65 to 70 degrees with stirring under a nitrogen atmosphere. When the solution had cooled to 55 degrees centigrade, 14.6 grams of redistilled ethyl oxalate was added. With continued slow stirring a solution of 3.37 grams of sodium methoxide in methanol (commercial 25 percent solution) was added as rapidly as possible. Almost immediately the reaction mixture became thick with greenish-yellow glyoxylate. Stirring was continued for fifteen minutes during which time the mixture was cooled to 35 degrees. A solution of 3.06 grams of anhydrous sodium acetate and 3.75 grams of glacial acetic acid in 200 milliliters of methanol which had been precooled to ten degrees centigrade, was added, and the mixture stirred until solution was achieved. The greenish-amber colored solution was cooled by means of an ice-salt bath to zero degrees and treated dropwise with continued stirring with a pre-cooled, zero-degree solution of twelve grams of bromine in 120 milliliters of methanol. The bromine was added at such a rate that in twelve minutes 110 milliliters had been added, and the reaction mixture had become colorless. Bromine was then added more slowly in portions until a permanent bromine color remained after five minutes of stirring. The total bromine uptake was 11.4 grams. A solution of 25 milligrams of phenol in 0.25 milliliter of methanol was added. This destroyed the excess bromine and again gave a colorless solution. With continued stirring and cooling a solution of 6.97 grams (5.17) equivalents, determined by equivalents of bromine used plus two equivalents of sodium methoxide in methanol was added rapidly in one portion. A bright orange color developed which soon faded to amber and later became green. The cooling bath was removed, the temperature raised to 25 degrees and the solution stirred for three hours. During this period crystallization occurred. Acetic acid and four grams of zinc dust were added and stirring continued for one hour. The excess zinc dust was removed by filtration and washed with 25 milliliters of methanol. The combined filtrate was poured slowly with stirring into approximately 2000 milliliters of ice and water. The white precipitate which separated was collected by filtration, washed with 100 milliliters of water, and dried at seventy degrees under vacuum. The crude yield was approximately 8.3 grams of $6\alpha$-methyl-4,17(20)-pregnadiene-3-one-21-oic acid methyl ester.

A 1.5 gram sample of the crude material was dissolved in fifty milliliters of benzene and assayed chromatographically on 90 grams of Florisil. The column was eluted in turn with 650 milliliters of five percent acetone Skellysolve B, 650 milliliters of 7.5 acetone Skellysolve B, 1300 milliliters of ten percent acetone Skellysolve B, 650 milliliters of 12.5 percent acetone Skellysolve B, and 130 milliliters of acetone. The eluate was collected in 130-milliliter fractions. Fractions 9 to 17 contained a total of 1.255 grams of crystalline methyl 3-keto-$6\alpha$-methyl-4,17-(20)-pregnadiene-21-oate.

A solution of 3.01 grams of methyl 3-keto-$6\alpha$-methyl-4,17(20)-pregnadiene-21-oate, three milliliters of pyrrolidine and ninety milligrams of toluenesulfonic acid in sixty milliliters of benzene was heated under reflux for one hour. The water formed in the reaction was co-distilled with the benzene and removed in a water trap. The solvent was distilled under vacuum using nitrogen through a capillary tube. The thus obtained crude enamine, methyl 3-(N-pyrrolidyl)-$6\alpha$-methyl - 3,5,17(20) - pregnatrien-21-oate was dissolved in fifty milliliters of benzene and ten milliliters of ether and added to a partial solution of 1.1 grams of lithium aluminum hydride in 175 milliliters of anhydrous ether. The time of addition was five minutes. The reaction mixture was stirred at room temperature (26 degrees centigrade) for 1.5 hours. The excess lithium aluminum hydride was destroyed by the cautious addition of ten milliliters of ethyl acetate. There was then added fifteen milliliters of water. The ether was distilled under vacuum with stirring. The residue was stirred at forty degrees centigrade with 200 milliliters of methanol until homogenous (3–5 minutes) and 35 milliliters of five percent sodium hydroxide solution was added. After ten minutes at forty degrees centigrade the sodium hydroxide was neutralized by the addition of ten milliliters of acetic acid. The methanol was distilled under vacuum with stirring. The residue was dissolved in fifty milliliters of methylene dichloride and 100 milliliters of water containing fifteen milliliters of concentrated hydrochloric acid. The methylene chloride was separated and the water extracted two times with fifty-milliliter portions of methylene chloride. The methylene chloride solution was washed with water and sodium bicarbonate and concentrated under vacuum to give 2.78 grams of $6\alpha$-methyl-21-hydroxy-4,17(20)-pregnadien-3 - one. The crude $6\alpha$-methyl-21-hydroxy-4,17(20)-pregnadien-3 - one was dissolved in ten milliliters of pyridine and five milliliters of acetic anhydride. After four hours at 26 degrees centigrade, ten milliliters of water was added to hydrolyze the excess anhydride. Cooling is necessary. The solution was then diluted with methylene dichloride and washed three times with dilute hydrochloric acid, water, sodium bicarbonate, and water. The solvent was distilled under vacuum to give 2.8 grams of a crude crystalline substance which was recrystallized from acetone Skellysolve B to give 1.5 grams of $6\alpha$-methyl-21-acetoxy-4,17(20)-pregnadien-3-one.

To three millimoles (1.11 grams) of $6\alpha$-methyl-21-acetoxy-4,17(20)-pregnadien-3-one, dissolved in sixty milliliters of tertiary butyl alcohol and 1.5 milliliters of pyridine at room temperature, was added five milliliters of a solution of osmium tetroxide in tertiary butyl alcohol, the solution containing 11.1 milligrams of osmium tetroxide and 0.2 milliliter of water. Thereupon 2.4 grams of phenyliodosoacetate was added. This dissolved in about twenty minutes. Five-milliliter aliquot samples were removed for titration to follow the reaction procedure. After about 22 hours the reaction was completed and thereupon twenty milliliters of water was added to the mixture. The mixture was then concentrated in vacuo to about twenty milliliters, then twenty milliliters more water was added, again concentrated in vacuo to twenty milliliters, and the residue was thoroughly extracted with ethylene chloride. The extracts were dried with sodium sulfate and chromatographed on eighty grams of Florisil. Three liters of seven percent acetone in ethylene chloride eluted 67.7 percent of theoretical yield of crystalline $6\alpha$-methyl-$17\alpha$,21-dihydroxy-4-pregnene-3,20-dione 21 - acetate.

A solution of 4.02 grams of $6\alpha$-methyl-$17\alpha$,21-dihydroxy-4-pregnene-3,20-dione 21-acetate in 400 milliliters of methanol was cooled to fifteen degrees and purged for five minutes with oxygen-free nitrogen. To this solution was added a solution of 4.09 grams of potassium carbonate in forty milliliters of water, similarly purged with oxygen-free nitrogen. The mixture was stirred for five and one-half hours, then acidified with sixty milliliters of ice water containing three milliliters of acetic acid. The mixture was concentrated to sixty milliliters, refrigerated and the precipitated solid product was filtered and washed with water. After drying overnight in vacuo, the weight of $6\alpha$-methyl-$17\alpha$-21-dihydroxy-4-pregnene-3,20-dione was 3.45 grams (95 percent yield).

A solution of one gram (2.77 millimoles) of $6\alpha$-methyl-$17\alpha$,21-dihydroxy-4-pregnene-3,20-dione in seven milliliters of pyridine was cooled to zero degrees and treated with 0.3 milliliter of methanesulfonyl chloride. The solution was allowed to stand at zero to five degrees centigrade for two hours, after which it was diluted with water and extracted with methylene chloride. The extract was washed with cold dilute hydrochloric acid until a pH of two to three was maintained in the aqueous layer, cold sodium bicarbonate solution, water, and dried with anhydrous sodium sulfate. Evaporation at reduced pressure gave a white, glassy product, of $6\alpha$-methyl-$17\alpha$,21-dihydroxy-4-pregnene-3,20-dione 21-methanesulfonate.

The crude 21-methanesulfonate of $6\alpha$ methyl-$17\alpha$,21-dihydroxy-4-pregnene-3,20-dione was dissolved in fifteen milliliters of acetone and treated with a solution of one gram of sodium iodide and ten milliliters of acetone at reflux temperature. The mixture was kept under reflux with stirring for fifteen minutes. Thereafter the heat was reduced and the mixture concentrated to dryness at reduced pressure to give $6\alpha$-methyl-$17\alpha$-hydroxy-21-iodo-4-pregnene-3,20-dione.

The crude $6\alpha$-methyl-$17\alpha$-hydroxy-21-iodo-4-pregnene-3,20-dione was slurried with fifteen milliliters of acetic acid and stirred for 45 minutes. Zinc dust was added and stirring continued for fifteen minutes. The excess zinc was removed by filtration. The filtrate was diluted with methylene chloride and washed with water and cold sodium bicarbonate solution until all acetic acid was neutralized. After drying through sodium sulfate the solution was chromatographed over 75 grams of Florisil synthetic magnesium silicate taking fractions of 200 milliliters each. The column was eluted with fourteen fractions of ten percent-Skellysolve B and one fraction of 100 percent acetone. Fractions 8 through 13 contained 766 milligrams of crystals which after recrystallization from acetone-Skellysolve B hexanes yielded crystalline 6α-methyl-17α-hydroxy-4-pregnene-3,20-dione.

EXAMPLE 6

*6α-Methyl-17α-Hydroxy-1,4-Pregnadiene-3,20-Dione*

One gram of 6α-methyl-17α-hydroxy-4-pregnene-3,20-dione (Preparation 5) was dissolved in fifty milliliters of tertiary butyl alcohol and 0.5 milliliter of acetic acid and thereto was added 600 milligrams of selenium dioxide. The mixture was stirred at a temperature of 75 to 80 degrees for 24 hours and then another portion of 600 milligrams of selenium dioxide was added and the reaction continued under the same conditions for an additional 24 hours. The mixture was filtered, evaporated to dryness and the residue extracted with ethyl acetate. The extracts were filtered to remove selenium dioxide left over from the first filtration and concentrated to a small volume. From this concentrated solution, the product 6α-methyl-17α-hydroxy-1,4-pregnadiene-3,20-dione crystallized upon standing.

EXAMPLE 7

*6α-Methyl-17α-Hydroxy-1,4-Pregnadiene-3,20-Dione 17-Acetate*

A solution of one gram of 6α-methyl-17α-hydroxy-1,4-pregnadiene-3,20-dione in 20 milliliters of acetic anhydride was heated at reflux for twelve hours. The reaction mixture was then concentrated to dryness under reduced pressure and the resulting residue was crystallized from Skellysolve B hexanes-acetone to give 6α-methyl-17α-hydroxy-1,4-pregnadiene-3,20-dione 17-acetate.

Following the procedure of Example 7 above, and substituting 6β-methyl-17α-hydroxy-1,4-pregnadiene-3,20-dione as starting material therein is productive of 6β-methyl-17α-hydroxy-1,4-pregnadiene-3,20-dione 17-acetate.

Similarly by following the acylation procedure described in Example 7 above, still other 17-acylates are prepared by reacting 6α-methyl-17α-hydroxy-1,4-pregnadiene-3,20-dione with the appropriate hydrocarbon carboxylic acid anhydride. Illustrative of the esters thus produced are 6α-methyl-17α-hydroxy-1,4-pregnadiene-3,20-dione 17-propionate, 6α-methyl-17α-hydroxy-1,4-pregnadiene-3,20-dione 17-(β-phenyl) propionate, 6α-methyl-17α-hydroxy-1,4-pregnadiene-3,20-dione 17-acrylate, 6α-methyl-17α-hydroxy-1,4-pregnadiene-3,20-dione 17-hexanoate, 6α-methyl-17α-hydroxy-1,4-pregnadiene-3,20-dione 17-maleate, 6α-methyl-17α-hydroxy-1,4-pregnadiene-3,20-dione 17-trimethylacetate, 6α-methyl-17α-hydroxy-1,4-pregnadiene-3,20-dione 17-benzoate, 6α-methyl-17α-hydroxy-1,4-pregnadiene-3,20-dione 17-butyrate, 6α-methyl-17α-hydroxy-1,4-pregnadiene-3,20-dione 17-laurate, 6α-methyl-17α-hydroxy-1,4-pregnadiene-3,20-dione 17-cyclohexane carboxylate, 6α-methyl-17α-hydroxy-1,4-pregnadiene-3,20-dione 17-propiolate, 6α-methyl-17α-hydroxy-1,4-pregnadiene-3,20-dione 17-isobutyrate, 6α-methyl-17α-hydroxy-1,4-pregnadiene-3,20-dione 17-phenylacetate, 6α-methyl-17α-hydroxy-1,4-pregnadiene-3,20-dione 17-crotonate, 6α-methyl-17α-hydroxy-1,4-pregnadiene-3,20-dione 17-valerate, 6α-methyl-17α-hydroxy-1,4-pregnadiene-3,20-dione 17-isovalerate, 6α-methyl-17α-hydroxy-1,4-pregnadiene-3,20-dione 17-(o-, m-, p-)-toluate, 6α-methyl-17α-hydroxy-1,4-pregnadiene-3,20-dione 17-hemisuccinate, 6α-methyl-17α-hydroxy-1,4-pregnadiene-3,20-dione 17-hemiadipate, 6α-methyl-17α-hydroxy-1,4-pregnadiene-3,20-dione 17-crotonate, 6α-methyl-17α-hydroxy-1,4-pregnadiene-3,20-dione 17-undecylenate, 6α-methyl-17α-hydroxy-1,4-pregnadiene-3,20-dione 17-cinnamate, 6α-methyl-17α-hydroxy-1,4-pregnadiene-3,20-dione 17-citraconate, and the like.

Similarly acylation of 6β-methyl-17α-hydroxy-1,4-pregnadiene-3,20-dione with the appropriate hydrocarbon carboxylic acid anhydride is productive of the corresponding 17-acylates. The preferred acylates are those corresponding to the acylates described above for 6α-methyl-17α-hydroxy-1,4-pregnadiene-3,20-dione.

I claim:
1. 6α-methyl-17α,21-dihydroxy-4-pregnene-3,20-dione.
2. A compound of the formula:

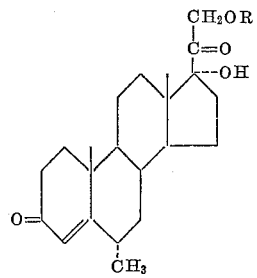

wherein R is selected from the group consisting of hydrogen and the acetyl radical.

No references cited.